United States Patent
Lin et al.

(10) Patent No.: US 8,948,538 B2
(45) Date of Patent: *Feb. 3, 2015

(54) REMOVAL OF IMAGE ARTIFACTS FROM SENSOR DUST

(75) Inventors: Stephen Lin, Beijing (CN); Baining Guo, Beijing (CN); Changyin Zhou, New York, NY (US)

(73) Assignee: Microsoft Corporation, Redmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/556,080

(22) Filed: Jul. 23, 2012

(65) Prior Publication Data
US 2012/0288196 A1  Nov. 15, 2012

Related U.S. Application Data

(63) Continuation of application No. 11/928,951, filed on Oct. 30, 2007, now Pat. No. 8,244,057.

(60) Provisional application No. 60/942,431, filed on Jun. 6, 2007.

(51) Int. Cl.
| | |
|---|---|
| G06K 9/40 | (2006.01) |
| H04N 5/217 | (2011.01) |
| G06T 5/00 | (2006.01) |
| H04N 1/409 | (2006.01) |

(52) U.S. Cl.
CPC .............. *H04N 5/2178* (2013.01); *G06T 5/005* (2013.01); *H04N 1/409* (2013.01); *G06T 2207/20021* (2013.01)
USPC ........................................................ 382/275

(58) Field of Classification Search
None
See application file for complete search history.

(56) References Cited

U.S. PATENT DOCUMENTS

| | | | | |
|---|---|---|---|---|
| 4,933,983 A | * | 6/1990 | Hiramatsu et al. | 382/112 |
| 5,535,291 A | * | 7/1996 | Spencer et al. | 382/254 |
| 5,638,465 A | * | 6/1997 | Sano et al. | 382/281 |
| 5,982,946 A | * | 11/1999 | Murakami | 382/272 |
| 6,940,550 B2 | * | 9/2005 | Kitawaki et al. | 348/246 |
| 7,206,461 B2 | | 4/2007 | Steinberg et al. | |
| 7,558,433 B1 | * | 7/2009 | Georgiev | 382/254 |
| 7,705,906 B2 | * | 4/2010 | Watanabe | 348/340 |

(Continued)

FOREIGN PATENT DOCUMENTS

| | | |
|---|---|---|
| JP | 07-143403 | 6/1995 |
| JP | 2001-057656 | 2/2001 |

(Continued)

OTHER PUBLICATIONS

"Digital Image Restoration," Mark R. Banham, et al., IEEE Signal Processing Magazine, Mar. 1997, pp. 24-41.*

(Continued)

*Primary Examiner* — Wenpeng Chen
(74) *Attorney, Agent, or Firm* — Dan Choi; Judy Yee; Micky Minhas

(57) ABSTRACT

Removal of the effects of dust or other impurities on image data is described. In one example, a model of artifact formation from sensor dust is determined. From the model of artifact formation, contextual information in the image and a color consistency constraint may be applied on the dust to remove the dust artifacts. Artifacts may also be removed from multiple images from the same or different cameras or camera settings.

18 Claims, 11 Drawing Sheets

(56) References Cited

U.S. PATENT DOCUMENTS

| | | | |
|---|---|---|---|
| 7,769,244 B2 * | 8/2010 | Kozlov et al. | 382/275 |
| 8,244,057 B2 * | 8/2012 | Lin et al. | 382/275 |
| 2001/0041018 A1 | 11/2001 | Sonoda | |
| 2002/0154831 A1 * | 10/2002 | Hansen et al. | 382/257 |
| 2003/0039402 A1 * | 2/2003 | Robins et al. | 382/275 |
| 2004/0145664 A1 | 7/2004 | Kobayashi | |
| 2004/0218806 A1 * | 11/2004 | Miyamoto et al. | 382/145 |
| 2005/0068446 A1 * | 3/2005 | Steinberg et al. | 348/335 |
| 2005/0068449 A1 * | 3/2005 | Steinberg et al. | 348/335 |
| 2006/0087584 A1 * | 4/2006 | Noto | 348/374 |
| 2006/0210191 A1 | 9/2006 | Silverstein | |
| 2006/0262992 A1 | 11/2006 | Kuwabara et al. | |
| 2007/0212058 A1 * | 9/2007 | Kawai | 396/429 |
| 2007/0274606 A1 * | 11/2007 | Thurston | 382/275 |
| 2009/0278981 A1 * | 11/2009 | Bruna et al. | 348/448 |

FOREIGN PATENT DOCUMENTS

| | | |
|---|---|---|
| JP | 2004-220553 | 8/2004 |
| JP | 2004-310000 | 11/2004 |
| JP | 2005318465 A * | 11/2005 |
| JP | 2006191206 A * | 7/2006 |

OTHER PUBLICATIONS

"An Optic Model of the Appearance of Blemishes in Digital Photographs," Zamfir et al, Digital Photography III San Jose, California; Feb. 20, 2007; SPIE-IS&T/ vol. 6502, 12 pages.*

"Digital Image Restoration," Mark R. Benham, et al., IEEE Signal Processing Magazine, Mar. 1997, pp. 24-41

"Improved Methods of Maximum a Posterlori Restoration," H. J. Trussell, et al, IEEE Transactions on Computers, vol. c-27, No. 1, Jan. 1979, pp. 57-62.

"Restoration of Randomly Blurred Images Via the Maximum A Posteriori Criterion," Ling Guan, et al, IEEE Transactions on Image Processing, vol. I, No. 2, Apr. 1992, pp. 256-262.

"On Missing Data Treatment for Degraded Video and Film Archives: A Survey and a New Bayesian Approach," Anil C. Kokaram, et al, IEEE Transactions on Image Processing, vol. 13, No. 3, Mar. 2004, pp. 397-215.

Bergman, et al., "Comprehensive Solutions for Removal at Dust and Scratches from Images", 2007 Hewlett-Packard Development Company, L.P, pp. 1-25.

Zheng et al., "Single-Image Vignetting Correction", Proceedings of the IEEE Computer Society Conference on Computer Vision and Pattern Recognition (CVPR'06), 2006, IEEE, pp. 8.

Pradhan, "Digital Image Restoration Techniques and Automation", Clemson University, 2004, pp. 5.

Willson, et al., "An Optical Model for Image Artifacts Produced by Dust Particles on Lenses", ESA SP-603, Sep. 2005, pp. 8.

Efros, et al., Image Quilting for Texture Synthesis and Transfer, ACM SIGGRAPH, 2001, pp. 341-346.

Komodakis, et al., "Image Completion Using Global Optimization", In Proceedings of IEEE Computer Vision and Pattern Recognition, 2006, pp. 442-452.

Chan, et al., "Non-texture in Paintings by Curvature Driven Diffusions", J. Visual Comm. Image Rep , vol. 12, No. 4, 2001, pp. 436-449.

Chan, et al., "Total Variation Blind Deconvolution", IEEE Trans. Image Proc., vol. 7, No. 3, 1998, pp. 370-375.

PCT International Search Report and Written Opinion for Application No. PCT/US2008/065995, Oct. 30, 2008.

Bertalmio, "Image Inpainting", Proceedings of the 27th Annual Conference on Computer Graphics, Jul. 23-28, 2000.

Efros, "Texture Synthesis by Non-parametric Sampling", Proceedings of the International Conference on Computer Vision, Sep. 20-25, 1999.

Heeger, "Pyramid-Based Texture Analysis/Synthesis", Proceedings of the 22nd Annual Conference on Computer Graphics, Aug. 6-11, 1995.

Kullback, "On Information and Sufficiency", The Annals of Matheonatical Statistics, Mar. 1951.

Levin, "Learning How to Inpaint from Global Image Statistics", 9th IEEE International Conference on Computer Vision, Oct. 14-17, 2003.

Liang, "Real-Time Texture Synthesis by Patch-Based Sampling", Proceedings of the ACM Transactions on Graphics, Jul. 2001.

Perez, "PatchWorks: Example-Based Region Tiling for Image Editing", Microsoft Research Technical Report, Jan. 13, 2004.

Sun, "Image Completion with Structure Propagation", Proceedings of the ACM SIGGRAPH Transactions on Graphics, Jul. 2005.

* cited by examiner

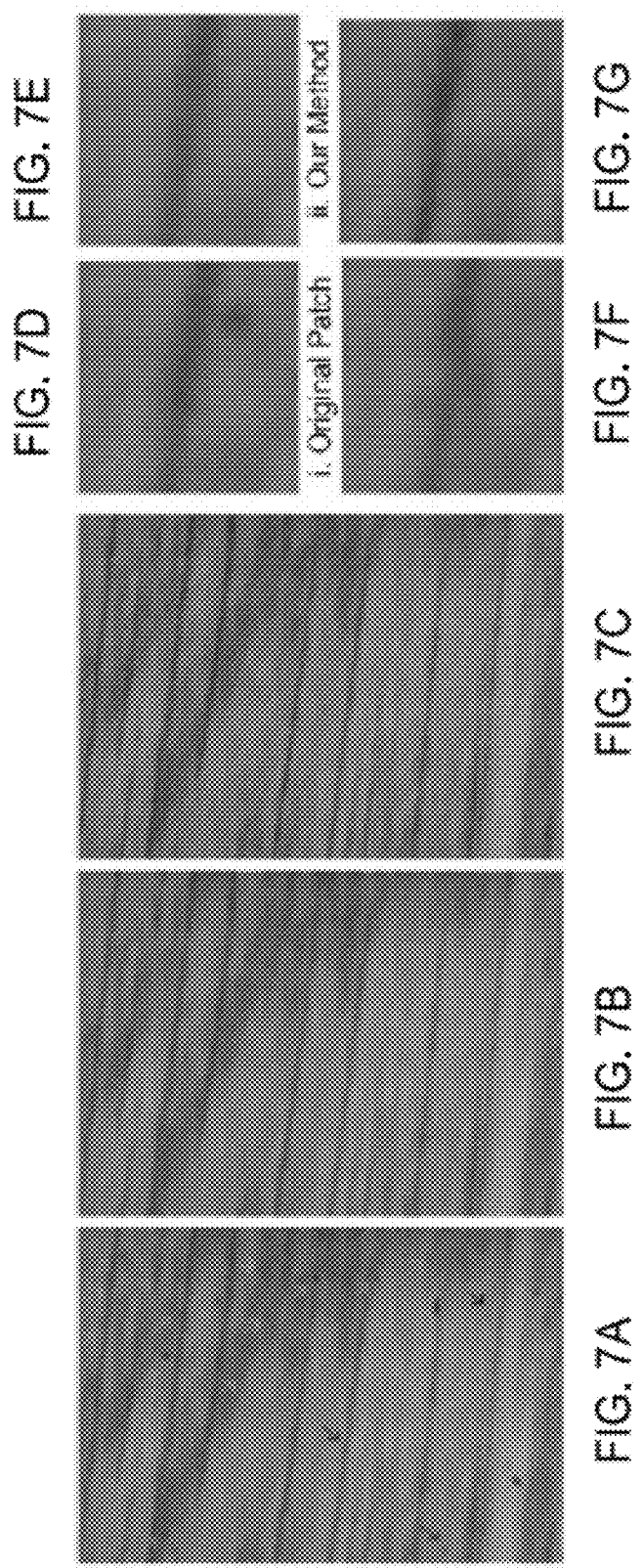

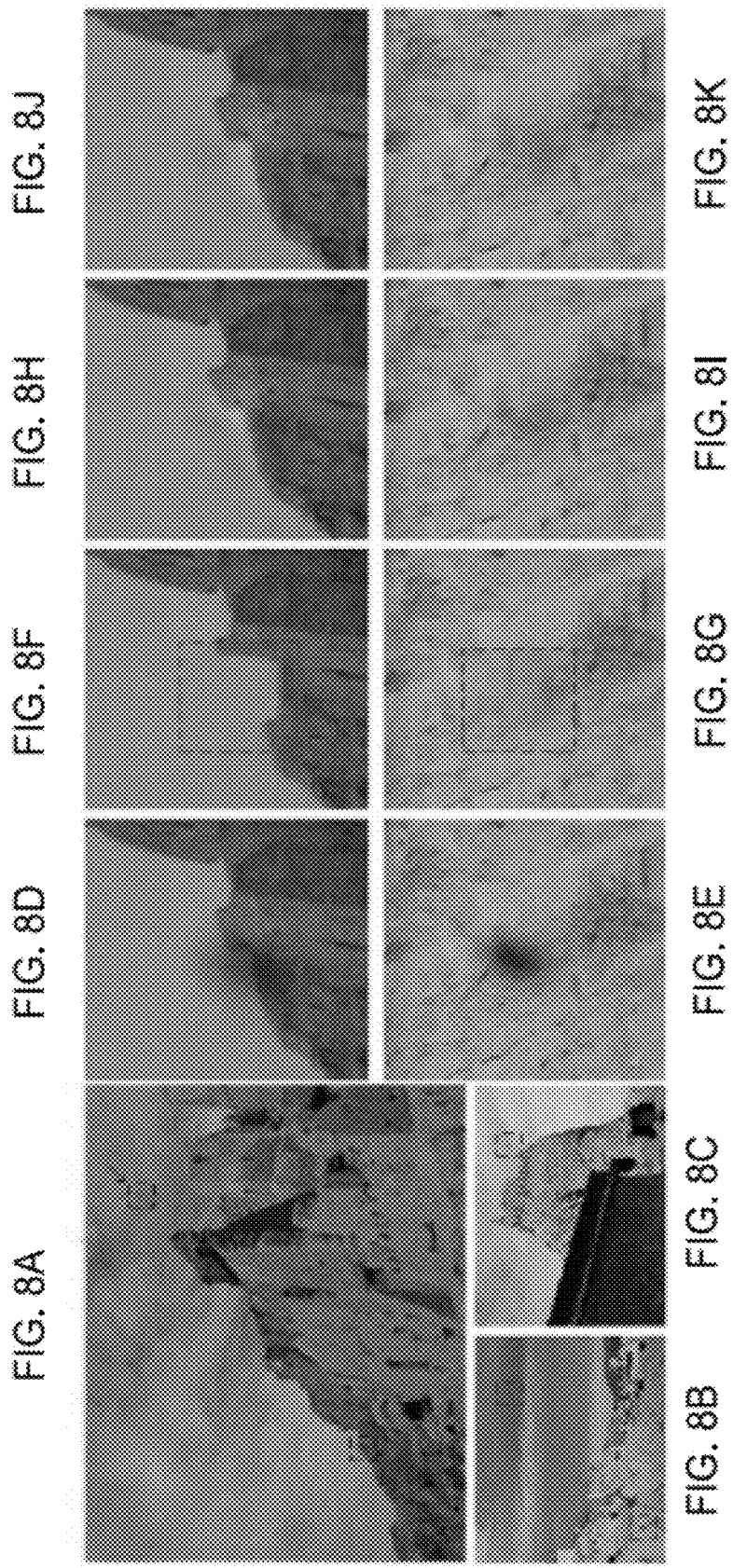

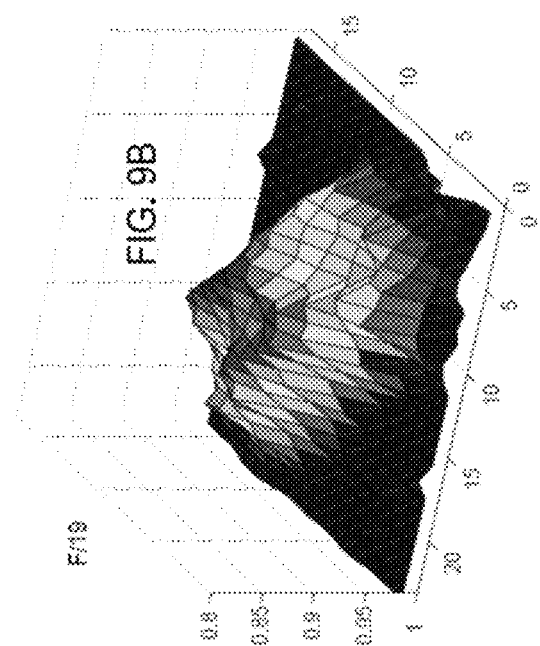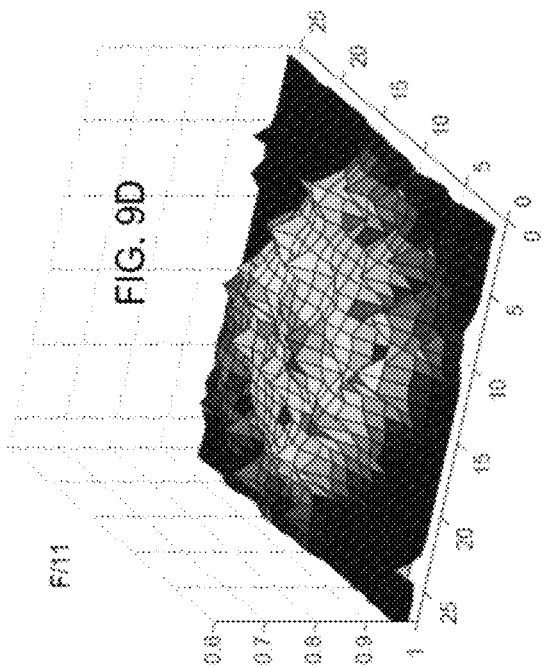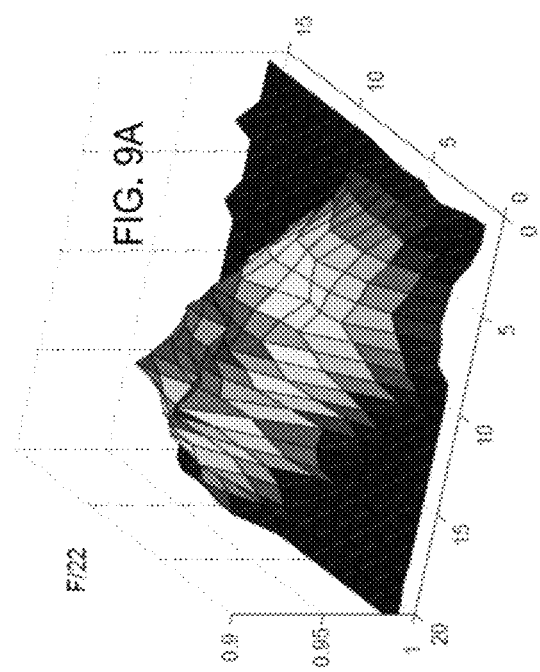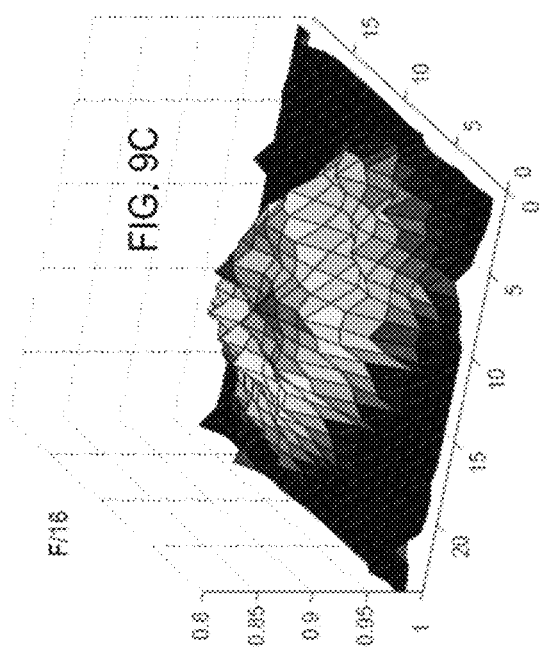

REMOVAL OF IMAGE ARTIFACTS FROM SENSOR DUST

CROSS-REFERENCE TO RELATED APPLICATION(S)

This application is a Continuation of and claims benefit from U.S. Pat. No. 8,244,057 that was issued on Aug. 14, 2012, and that claims benefit from U.S. Provisional Patent Application No. 60/942,431 that was filed on Jun. 6, 2007, each of which is incorporated herein by reference in its entirety.

BACKGROUND

In photography or image acquisition and/or processing techniques, impurities can cause imperfections in any images produced. For example, if dust is introduced into a camera or image processing system, such dust can cause obstructions, shadows or other extraneous or undesired artifacts in any images that are ultimately produced. Such impurities may enter the system by any number of ways including, for example, when lenses are interchanged.

During lens exchange, sensors may become exposed to the environment while dust may gain entry into the system through any openings created by removal or displacement of the lens. The result is that the impurities may block light entering the system and may create dark spots on images.

Dust or other impurities or the effects caused by the presence of such impurities may be decreased or removed from an image processing or image capturing system. In one example, the impurities may be physically removed from a sensor. For example, cleaning liquids, brushes, vacuums, and/or dust adhesives may be applied to the sensor to remove any impurities on the sensor. In another example, images may be captured with the impurities in place and the effects of the impurities on the images that are captured may be removed via photo software. For example, dust particles may be not be noticed until after the images are captured and produced. In such processes, a cloning tool may be used to manipulate the image such that the effects of the dust particles are reduced in the final image. In another example, manual cloning may be performed or image inpainting and texture synthesis may be utilized to reduce the effects created by the impurities or dust in the system.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Removal of effects of impurities, such as dust particles, from an image is described. In one example, an artifact model is determined. Additional contextual information in the image and/or a color consistency constraint on the impurities may be identified. Artifacts from the impurities are removed from identified dust regions on the image.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIGS. 7A-7G illustrate another example of dust removal and candidate detection for a single image.

FIGS. 8A-8K illustrate another example of results for complex input images.

FIGS. 9A-9D illustrate artifacts resulting from impurities.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Formation of Dust Artifacts

Figure 1:
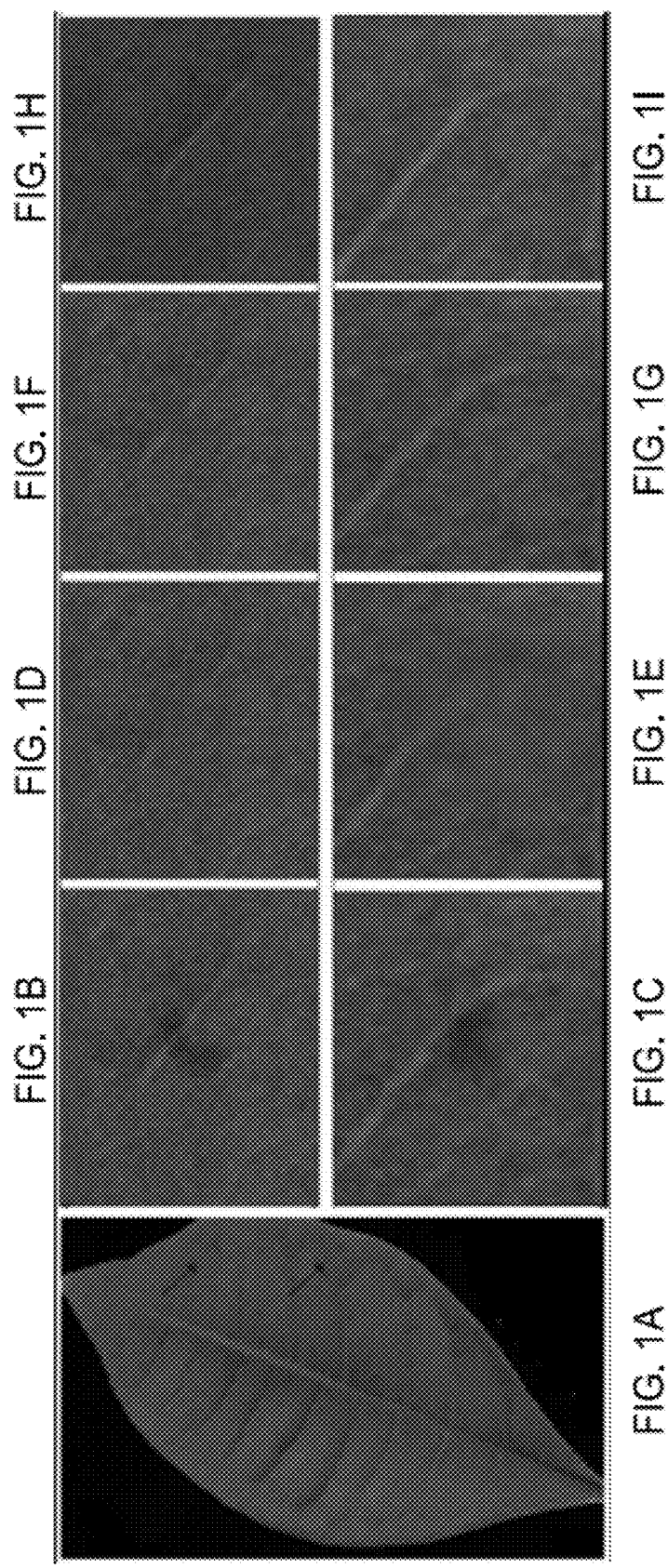
FIGS. 1A-1I illustrate one example of dust regions in an image.

FIGS. 1A-1I illustrate one example of dust regions in an image. In this example, an image of a leaf (FIG. 1A) is provided. The leaf in the image contains background information within dust regions. FIGS. 1B and 1C illustrate an example of identified dust regions that contain background information. This background information may be utilized in conjunction with an artifact formation model to obtain images with minimized or removed dust effects. In this example, texture synthesis is performed (FIGS. 1D and 1E) to obtain an image in which the dust effects have been removed. In FIGS. 1F and 1G, an alternate process of dust/impurity effect removal as described herein below is applied to the dust regions of the image. As FIGS. 1F and 1G illustrate, image results are obtained that are more similar to the ground truth (FIGS. 1H and 1I) than texture synthesis (FIGS. 1D and 1E). The term "image" and "digital image" as used herein typically refer to all or a portion of a digital photograph, typically embodied as a file comprising data in a digital image format. The term "ground truth" as used herein typically refers to the actual or original scene being photographed or digitally imaged.

In another example, sensor dust may accumulate on a low-pass filter resting upon or in front of a sensor array. Such a low-pass filter is typically a thin layer that slightly blurs the light reaching the sensor array so as to reduce Moiré effects and the like. Attenuation of light may be observed in an image as a result of the accumulated sensor dust on the filter. In addition, attenuation of light may also be related to imaging geometry specified by camera settings such as described in connection with FIG. 2. Thus, in this example, a space of image artifacts (e.g., the range of possible image effects caused by a particle of dust) may be identified in an image with respect to camera settings and possible solutions (e.g., possible appearances of the scene that is occluded by the dust) for the dust background may be determined corresponding to the identified space. For example, a darkened region may be identified within an image. The darkened region may represent a portion of the actual image or may alternatively represent dust or other impurities. In this example, candidate dust regions may be determined in the image based on adherence to image context and/or a dust artifact model. Certain regions of the image may be determined to contain dust effects.

Dust particles (or other impurities) may attenuate light and cause a corresponding alteration in an image. In one example, the light attenuation from dust particles may be represented as follows:

$$I(x) = U(x) \cdot \alpha(x)$$

where $I(x)$ represents a recorded image intensity at a pixel $x$ of a sensor array, $U$ represents a dust-free image to be recovered (e.g., how the image would appear if there was no dust on the filter and/or sensor), and $\alpha$ models the attenuation due to sensor dust. In one example, the dust may lie on a low-pass filter rather than directly on the sensor. In this case, the artifact function $\alpha$ may represent a projection of the dust's transparency function $\beta$. The geometry of this projection may be dependent upon camera settings. Also, light passing through dust particles may undergo some amount of scattering that may be not be modeled by a transparency function as such scattering is typically considered to have a negligible effect. The geometry of this projection may also depend on camera settings, which may substantially affect $\alpha$ for a given $\beta$. FIGS. 9A-9D illustrate examples of light attenuation in two dimensions resulting from impurities such as dust with different camera settings. In these examples, greater height represents greater light attenuation. In FIG. 9A, an artifact is produced with the F-number of the camera set to F/22. In FIG. 9B, the camera is set to F/19. In FIG. 9C, the camera is set to F/16 and in FIG. 9D, the camera is set to F/11. As FIGS. 9A-9D illustrate, an artifact produced by a given dust may appear differently under different camera settings. In this example, artifact functions a may be estimated from a uniform scene and may further contain image noise. The term "uniform scene" as used herein typically refers to a scene consisting of a single constant color. The dust artifact function a typically describes the effects of dust and the like on a dust-free image. In one example, it describes the percentage of light transmitted though the dust at each pixel of the image.

Projection of Dust Effects

Figure 2:
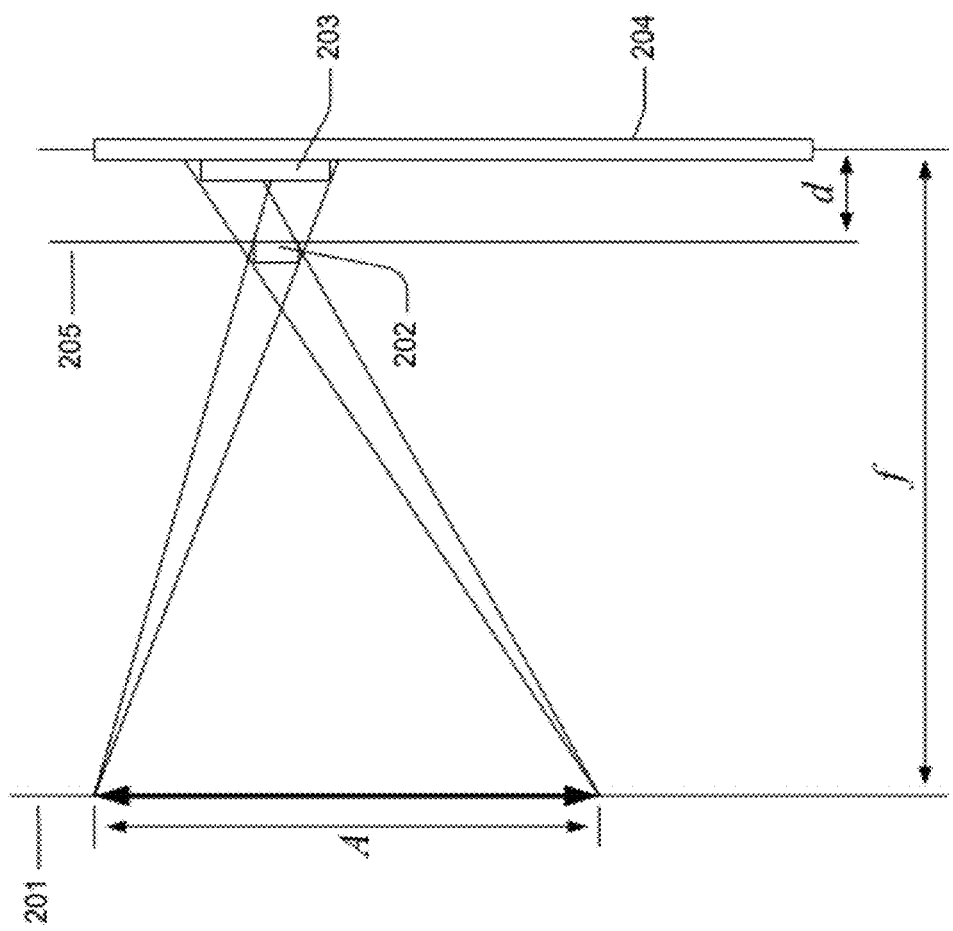
FIG. 2 illustrates one example of projecting dust transparency.

FIG. 2 illustrates an example model of projected dust artifacts including one example of projecting dust transparency. This model tends to describe how dust effects are projected onto a sensor according to camera geometries. Dust transparency may be projected from a low-pass filter 205 to a camera sensor 204. As FIG. 2 illustrates, light may be transmitted via an aperture A from a lens 201. The light may strike a dust particle 202 on the low-pass filter 205. The light may further be detected on a sensor 204. As a result of the effect of the dust particle 202 on the incoming light, the image on the sensor 204 may further contain an artifact 203 ($\alpha(x)$). The dust transparency function may be represented as follows:

$$\beta: L^2 \rightarrow [0,1]$$

where $L^2$ represents the set of image pixels. The dust transparency function may manifest itself as an artifact function in the image as follows:

$$\alpha: L^2 \rightarrow [0,1]$$

$\alpha(x)$ in this example may represent the proportion of scene radiance that passes through the dust 202 and reaches a pixel $x$ of sensor array 204.

If the camera has a focal length f that is larger than the offset d of the low-pass filter from the sensor, and the dust size is smaller than the aperture size A, the effect of an arbitrary point on the dust particle 202 may be spread over the sensor 204 according to a conventional rectangular or rect function. The rect function may be defined in one example as follows:

$$\sqcap_\tau(x) = \begin{cases} 0 & \text{if } |x/\tau| > 1/2 \\ 1/2 & \text{if } |x/\tau| = 1/2 \\ 1 & \text{if } |x/\tau| < 1/2 \end{cases} \quad \text{Eqn. (1)}$$

Based on triangle similarity (e.g., as illustrated in FIG. 2), the scale $\tau$ of the rect pulse may be calculated as follows:

$$\tau = d \cdot A/f$$

In another example, the value of f/A may be equal to the camera's F-number setting, which may be recorded in an image file (e.g., in an exchangeable image file format ("EXIF") data of the image file).

In another example, the projection from $\beta$ to $\alpha$ may be expressed as a convolution operation as follows:

$$\alpha = \beta * \sqcap_\tau$$

If the sensor dust lies on a low-pass filter, blurring from the filter may also have an effect on the formation of $\alpha$. Even so, such an effect is typically considered negligible.

Artifact Formation Model

An artifact formation model may be constructed based on a function space of possible dust artifacts $\alpha$. A function space of possible dust artifacts a may be determined with respect to the projection geometry factor $\tau$ and the bounds of dust transparency $\beta$. The functions space typically provides a range of light attenuation functions for a given dust particle or the like. As FIG. 9 illustrates, as values of $\tau$ increase, dust artifacts may become additionally blurred. For example, a broader conventional convolution kernel as described in Eqn. (1) may produce an essentially more blurred image from dust artifacts. Also, if $\beta: L^2 \rightarrow [0,1]$ then a function space $D_\tau$ of valid artifacts a with respect to r may be expressed as follows:

$$D_\tau = \{\alpha: \beta * \sqcap_\tau = \alpha, 0 \le \beta \le 1\} \quad \text{Eqn. (2)}$$

Together with the image information within a dust region, this function space may implicitly define a space of possible dust backgrounds, which may further serve as a constraint on the dust removal solution.

Recovering a Dust-Free Region

Given dust region $D \in \Omega$, where $\Omega$ is typically the set of all image pixels, dust removal may be performed to recover a dust-free appearance $U_D$. In one example, $U_D$ may be further characterized as follows:

$$I_D = U_D \cdot (\beta * \sqcap_\tau) + n$$

where n typically represents a noise level (e.g., intensity perturbations at an image pixel that may be caused by a variety of factors such as electronic and photometric fluctuations or the like).

The dust transparency function $\beta$ and the geometry factor r may be unknown since the low-pass filter displacement d may not be provided with a camera. In this case, contextual information $I_{\Omega/D}$ from outside the dust region may be utilized in conjunction with the artifact formation model to recover the actual scene appearance that is occluded by dust or the like.
Energy Function Formulation For example, the recovery may be formulated as the following Maximum A Posteriori ("MAP") estimation:

$$\hat{U}_D = \text{argmax} P(U_D, \alpha \mid I)$$
$$= \text{argmax} P(U_D, \alpha, U_D, I_{\Omega/D})$$
$$= \text{argmax} P(I_D \mid U_D, \alpha, I_{\Omega/D}) \cdot P(U_D, \alpha \mid I_{\Omega/D}) \cdot (I_{\Omega/D})$$
$$= \text{argmax} P(I_D \mid U_D, \alpha, I_{\Omega/D}) \cdot P(U_D, \alpha \mid I_{\Omega,D})$$

If $\alpha$ is independent of $U_D$ and $I_{\Omega/D}$, and $I_D$ is conditionally independent of $I_{\Omega/D}$ given $U_D$ and $\alpha$, then:

$$\hat{U}_D = \text{arg max } P(I_D \mid U_D, \alpha) \cdot P(U_D \mid I_{\Omega/D}) \cdot P(\alpha)$$

Expressed as a logarithmic energy function with minimization of:

$$E(U_D, \alpha \mid I) = \lambda_1 E_1(I_D \mid U_D, \alpha) + \lambda_2 E_2(U_D \mid I_{\Omega/D}) + \lambda_3 E_3(\alpha) \qquad \text{Eqn (3)}$$

where the terms $\lambda_1$, $\lambda_2$, and $\lambda_3$ are typically weights for their corresponding constraints $E_1$, $E_2$, and $E_3$.

In one example, the term $E_1$ is derived from the relationship $I_D = U_D \cdot \alpha$, which typically describes the basic relationship between a dust artifact, a corresponding recovered region, and a corresponding dusted region of an image In one example, the term $E_2$ is derived by comparison of sub-regions in an undusted region to sub-regions of equal size in the surrounding image areas. This energy term favors solutions whose sub-regions are similar to the surrounding image context. Basically, this is evaluated by taking each sub-region and comparing it with sub-blocks outside the dust region to find the sub-region that is most similar to it; then the difference between these sub-regions is the energy contributed to this energy term. As used herein, the term "sub-region" typically refers to a portion of a region (e.g., a 7 by 7 pixel sub-region of a 15 by 15 pixel region, or the like).

In one example, the term $E_3$ is derived as the distance between the converged solution for alpha and the space of possible alphas determined from the model of projected dust artifacts. To compute this distance, we typically find the closest point in the subspace to alpha by computing $P_D(\alpha) \in D_\tau$ as described herein below, and then by calculating the distance between alpha and the closest point according to equation 6.

In another example, the energy term $E_1$ is the energy function constraint from artifact formation, which penalizes solutions according to how different the dust-free image multiplied by the dust artifact function $\alpha$ is from the observed image or ground truth. The term $E_1$ may use the artifact formation model for image information in the dust region. $E_1$ may further be defined as the $L_2$ distance between $I_D$ and $U_D \cdot \alpha$ as follows:

$$E_1(I_D \mid U_D, \alpha) = \frac{1}{2} \| I_D - U_D \cdot \alpha \|^2 \qquad \text{Eqn. (4)}$$

The coefficient $\lambda_1$ is related to the noise level of n and may be large and/or proportional to the signal-to-noise ratio. For example, the noise level n may be large if the signal-to-noise ratio is large. In one example, the relation between $\lambda_1$ and the noise level of n is described by T. F. Chan and C. K. Wong in "Total variation blind deconvolution," *IEEE Trans. Image Proc.*, 7(3):370-375, 1998, which is incorporated herein by reference in its entirety.

In another example, the term $E_2$ is the contextual constraint of the energy function, which penalizes solutions according to how different the appearance of a sub-region of a recovered region is from the surrounding image areas. Thus, the term $E_2$ may utilize contextual constraints from the surrounding image (e.g., the context is the surrounding image areas and provides an indication of what the undusted region should look like and serves as a constraint for the algorithm). The recovered region represented by the parameter $U_D$ may have local appearance features that may be consistent with those in neighboring areas, and image transitions may be smooth at the region boundaries. The energy may further be defined as follows:

$$E_2(U_D \mid I_{\Omega/D}) = \sum_{D_i \in D} \text{dist}(U_{D_i}, I_{\Omega/D})^2 \qquad \text{Eqn. (5)}$$

where $D_i$ may be a member of a set of overlapped sub-blocks D, and:

$$\text{dist}(U_{D_i}, I_{\Omega/D}) = \frac{1}{2} \| U_{D_i} - I_{B_i} \|^2$$

with $$B_i = \underset{B \in \Omega/D}{\text{argmin}} \| U_{D_i} - I_B \|^2.$$

In one example, the energy defined by equation 5 is similar to that described by N. Komodakis and G. Tziritas in "Image completion using global optimization," *Proc. IEEE Computer Vision and Pattern Recognition*, pages 442-452, 2006, which is incorporated herein by reference in its entirety.

In another example, the term $E_3$ is the function space constraint of the energy function, which penalizes solutions according to how different the recovered artifact function is from the space of possible artifact functions (as expressed by equation 2) from the model of projected dust artifacts. Thus, the term $E_3$ may represent a constraint from the function space of $\alpha$. For an estimated $\alpha$, $E_3(\alpha)$ may be defined as the minimal $L_2$ distance to the function space $D_\tau$ as follows:

$$E_3(\alpha) = \frac{1}{2} \| \alpha - P_{D_\tau}(\alpha) \|^2 \qquad \text{Eqn. (6)}$$

where $P_{D_\tau}(\alpha)$ may include the projection of $\alpha$ onto the space $D_\tau$:

$$P_{D_\tau}(\alpha) = \underset{u \in D_\tau}{\text{arg min}} \| \alpha - u \|$$

In one example, computing $P_{D_\tau}(\alpha) \in D_\tau$ is equivalent to finding $\beta^*$ where $(0 < \beta^* < 1)$ that minimizes $F = \frac{1}{2} \| \alpha - \beta^* M_\tau \|^2$ where $M_\tau = \pi_\tau$. Also, $\beta^*$ may further be solved using a partial derivative:

$$\frac{\partial F}{\partial \beta} = (\alpha - \beta * M_\tau) * \overline{M}_\tau$$

where $M_\tau = \pi_\tau(x, y)$ and $\overline{M}_\tau = \pi_\tau(-x, -y)$ and where estimating the value of the projection geometry factor $\tau$ is described herein below.

The term $E_2$ may be any texture synthesis or inpainting objective function to propagate contextual information from the surrounding image. In one example, a patch-based texture synthesis may be used, such as described by A. A. Efros and W. T. Freeman in "Image quilting for texture synthesis and transfer," *ACM SIGGRAPH*, pages 341-346, 2001, in conjunction with a global optimization procedure, such as by N. Komodakis and G. Tziritas in "Image completion using global optimization," incorporated by reference herein above. The synthesis may be regulated by physical knowledge on artifact formation ($E_3$) together with observed image information within the dust region ($E_1$).

Energy Function Optimization

Optimization of an energy function may be performed. For example, the energy function of equation (3) may be optimized in which estimation of $\alpha$ may be correlated with a prediction of $U_D$. Similarly, $U_D$ may depend on an accurate function $\alpha$. Thus, an alternating minimization approach may be used to optimize the energy function $E(U_D, \alpha | I)$. This iterative optimization technique alternately solves for $\alpha$ and $U_D$. During the iterations, once the value of $\alpha$ converges, the corresponding minimized value of $U_D$ is taken as the solution. Minimizing the energy function in this manner directly yields the value of $U_D$, which is the dust-free image and the final output of the algorithm. In one example, an appropriate alternating minimization approach is described by T. F. Chan and C. K. Wong in "Total variation blind deconvolution," incorporated by reference herein above.

For example, texture synthesis may be applied to a set of candidate dust regions. In this example, an initialization parameter may be determined such as $U_D^{(0)}$ via the texture synthesis. In addition, initialization parameters may be determined by fitting two-dimensional ("2D") Gaussians on small overlapping image patches and evaluating concavity. An alternating sequence of conditional minimizers may then be determined as follows:

$$u_D^{(0)} \to a^{(0)} \to u_D^{(1)} \to \alpha^{(1)} \to \ldots \to u_D^{(n)} \to \alpha^{(n)} \to \ldots$$

according to:

$$\alpha^{(n)} = \arg\min E(\alpha | I, U_D^{(n)})$$

$$U_D^{(n+1)} = \arg\min E(U | I, \alpha^{(n)})$$

where partial derivatives of E can be computed from equations (3), (4), (5), and/or (6) as follows:

$$\frac{\partial E}{\partial U_D} = \lambda_1 \alpha'(U_D \cdot \alpha - I_D) + \lambda_2 \sum_{D_i \in D}(U_{D_i} - I_{B_i})$$

$$\frac{\partial E}{\partial \alpha} = \lambda_1 U_D'(U_D \cdot \alpha - I_D) + \lambda_3(\alpha - P_{D_\tau}(\alpha))$$

The sequence may further be iteratively computed until $\alpha$ converges, or until $\|\alpha^{(n)} - \alpha^{(n+1)}\|_\mu < \epsilon$ where $\epsilon$ is an arbitrary small number. At this point, values $U_D$, and $\alpha$ of the energy function are considered minimized. The converged or minimized value of $a$ is also known herein as the "recovered artifact function".

Evaluation of Color Consistency Constraints

Color consistency constraints may be evaluated to further improve recovery. For example, the process may be applied to each color channel of an image independently and correlations between channels may be identified and applied as additional constraints for radiometrically calibrated cameras. A dust particle may be composed of any number of materials but are typically composed of a single material. In one example, one may generally assume that a dust particle is composed of a single material that is monochromatic or of uniform color. Upon normalization, the a may be proportional in multiple channels (e.g., three channels such as red, green, and blue or "r, g, b"), such that:

$$\alpha_r(x)/\Sigma_x\alpha_r(x) = \alpha_g(x)/\Sigma_x\alpha_g(x) = \alpha_b(x)/\Sigma_x\alpha_b(x)$$

The normalized $\alpha$ functions in the multiple channels (e.g., three channels such as r, g, b) may have a minimal Kullback-Leibler ("K-L" or "KL") divergence to an optimized $\alpha^*$ as follows:

$$\alpha^* = \operatorname*{argmin}_{\Sigma \alpha(x)=1} \sum_{i=r,g,b} KL\left(\alpha_i \Big\| \alpha_i / \sum_x \alpha_i\right) \quad \text{Eqn. (7)}$$

where $KL(\cdot\|\cdot)$ represents the K-L divergence:

$$KL(P\|Q) = \sum_x P(x)\log\frac{P(x)}{Q(x)}.$$

From equation 7, an energy function may be derived that may represent a color consistency constraint on dust as follows:

$$E_4(\alpha_r, \alpha_g, \alpha_b) = \frac{1}{2}\sum_{c=r,g,b}\left\|\alpha_c - \alpha^* \cdot \sum_x \alpha_c\right\|^2$$

This energy term may further be integrated with eqn. 3 such that:

$$E = \lambda_1 E_1 + \pi_2 E_2 + \lambda_3 E_3 + \lambda_4 E_4$$

Alternatively or additionally, in a minimization algorithm, a partial derivative of E with respect to a for each channel c=r,g,b may be given as follows:

$$\frac{\partial E}{\partial \alpha_c} =$$

$$\lambda_1 \cdot \sum U_D'(U_D \cdot \alpha_c - I_D) + \lambda_3 \cdot (\alpha_c - P_{D_\tau}(\alpha_c)) + \lambda_4 \cdot \left(\alpha_c - \alpha^* \cdot \sum_x \alpha_c\right)$$

Estimation of Projection Geometry Factor $\tau$

In one example, the value of $\tau$ may be unknown. For example, a low-pass filter displacement d may be unavailable from a sensor. If $\tau$ defines a function space $D_\tau$ of $\alpha$, the energy term $E_3$ may be affected (e.g., eqn. (6)). For example, the volume of space $D_\tau$ may be negatively related to the value of $\tau$. When $\tau$ approaches zero in this case, $D_\tau$ may accommodate any function $0 \le \alpha \le 1$. As $\tau$ increases, the space of valid artifact functions may become constricted. Thus, values of $\tau$ that are greater than the actual value $\tau^*$ have a corresponding $D_\tau$ that may not admit true artifact functions in an image. As a result, the optimization energy E computed for $\tau > \tau^*$ may tend to increase sharply with respect to $\tau$. Alternatively, a space $D_\tau$ for $\tau \le \tau^*$ may admit valid artifacts, and hence may have optimization energies that decrease less rapidly with respect to $\tau$. Thus, in this example, some decrease in energy may exist because a broader range of artifact functions may allow more flexible use of contextual data.

Figure 5C:
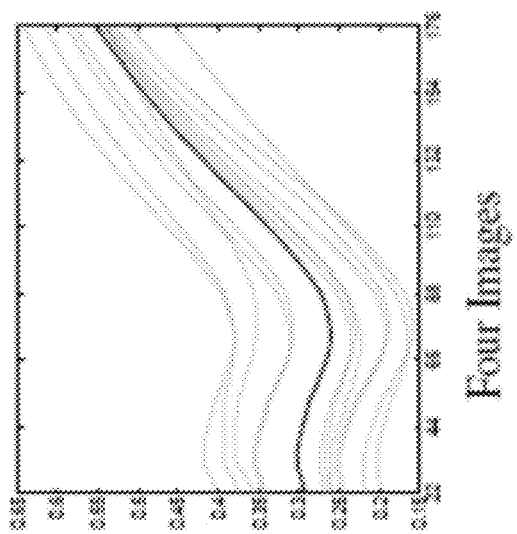
FIGS. 5A, 5B, and 5C illustrate optimization energies.
Figure 5B:
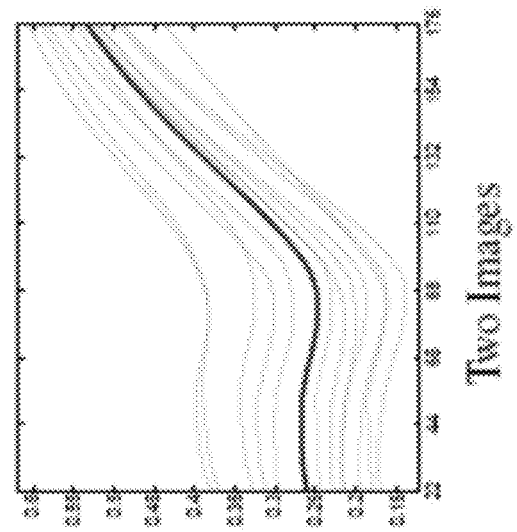
Figure 5A:
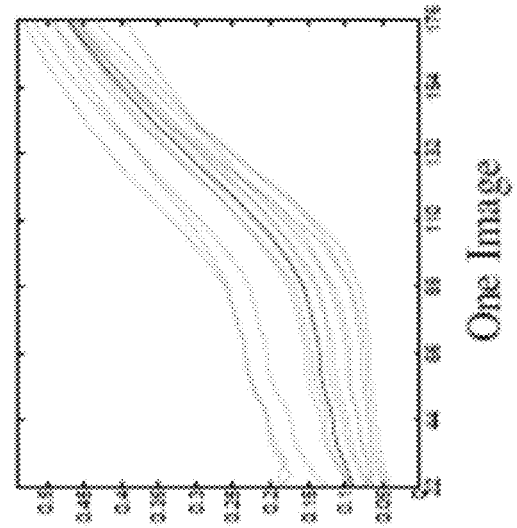

Based on this characteristic, $\tau$ may be estimated by examining the optimization energy E computed for sampled values of $\tau$. FIGS. 5A, 5B, and 5C illustrate optimization energies. In this example, optimization energy $E_d$ is illustrated against low-pass filter displacement d for twelve dust regions in an imaging system. In FIG. 5A, results for a single input image at F/11 are provided. In FIG. 5B, results for two images at F/11 and F/22 are provided. FIG. 5C illustrates results of four images at F/11, F/16, F/19, and F/22. For a single image, d may be estimated from second derivatives, and for multiple images, d may be determined from the minimum energy.

FIG. 5A further illustrates estimating $\tau$ by examining the optimization energy E for sampled values of $\tau$. If E changes rapidly for $\tau > \tau^*$ and slowly for $\tau \leq \tau^*$, $\tau$ may be estimated as arg max$_\tau$ $\partial^2 E/\partial \tau^2$. In another example, discrepancies between $\tau$ and $\tau^*$ are small, for example, when valid artifacts still lie in $D_\tau$ for an underestimated $\tau$, and dust particles without sharp edges are still admissible for a slightly overestimated $\tau$. Dust particles typically do not have sharp edges but, if they do, they may not be admissible if the value of $\tau$ is overestimated.

In another example, d includes a fixed value for a given camera or imaging system. In this example, if the distance d is recovered for a camera or imaging system (e.g., using multiple images), then other users of the system may utilize the value to determine $\tau$ as d·A/f where f/A is the F-number setting.

Detection of Candidate Dust Regions

Figure 3:
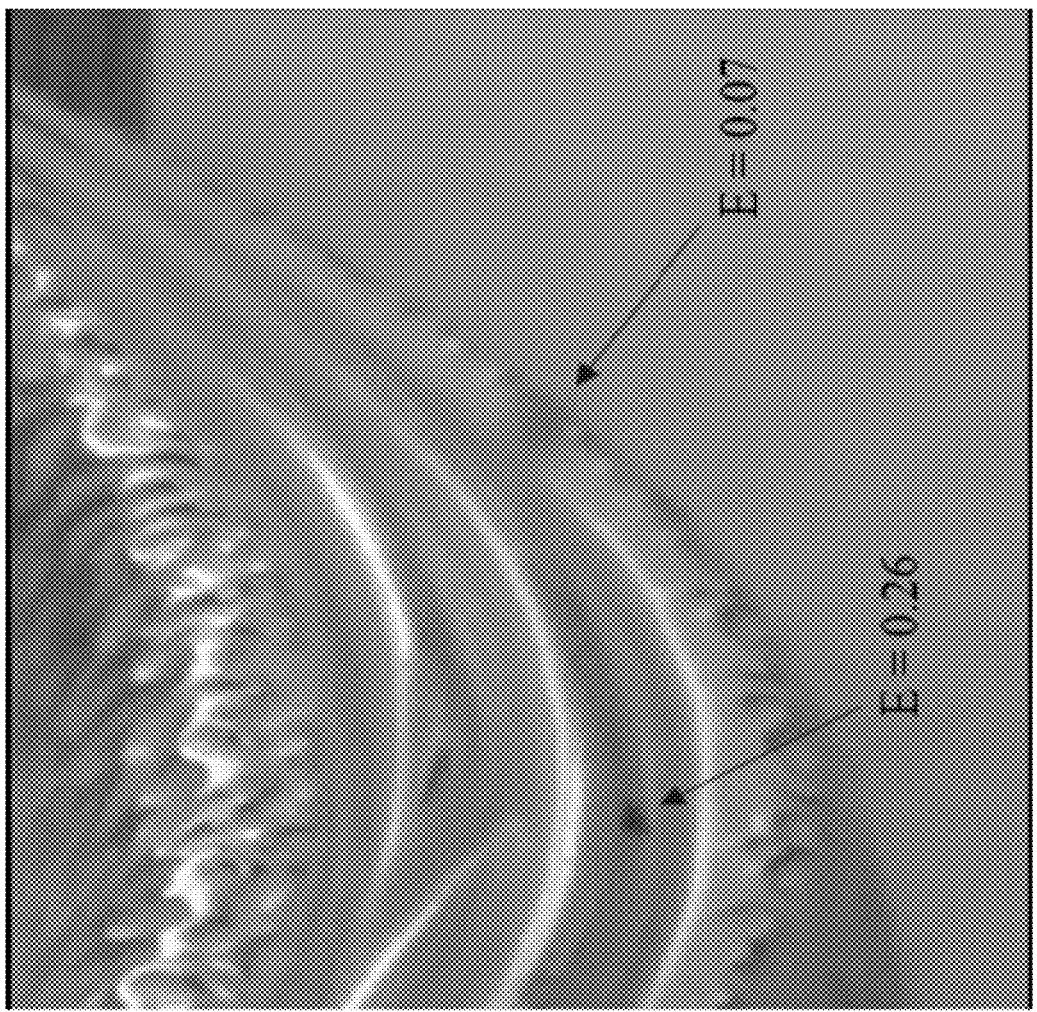
FIG. 3 illustrates examples of results of candidate detection.
Figure 4:
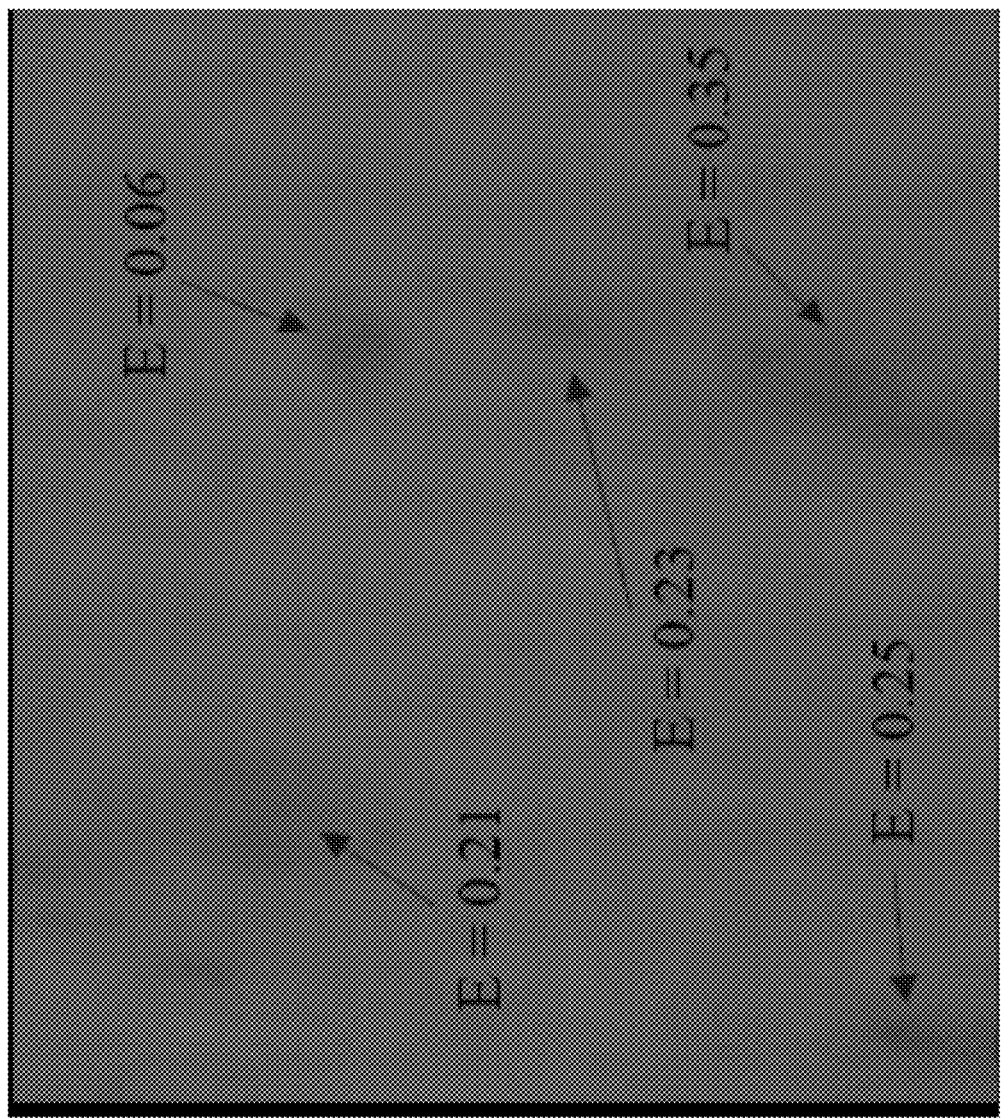
FIG. 4 illustrates another example of results of candidate detection.

Candidate dust regions may be detected using the estimated value of $\tau$. For example, when $\tau$ is set, optimization energy values for regions in an image may be determined. Since lower energies indicate a recovery result that is more consistent with image context and the dust artifact model in this example, the corresponding regions may be more likely candidates to contain dust. FIG. 3 and FIG. 4 illustrate examples of results of candidate detection. In FIG. 3, candidate dust regions are detected based on optimization energy in which the only true dust regions are E=0.07. In FIG. 4, candidate dust regions are detected based on optimization energy in which the only true dust region is E=0.06. Additional candidates in FIG. 4 are part of the image texture and have less color consistency in their estimated artifact functions.

As illustrated in FIGS. 3 and 4, dust artifacts may often be distinguished from dark scene spots because of dust projection characteristics and color consistency. In another example, a list of candidate regions ordered by increasing energy may be presented to the user to aid in dust detection.

Example Recovered Dust-Free Images

In FIGS. 1A-1I of example recovered dust-free images, energy function coefficients were set to $\lambda_1=0.9$, $\lambda_2=0.4$, $\lambda_3=0.9$, and $\lambda_4=0.9$ and the value of $\tau$ may be determined to be, for example, 10. From an ordered list of candidate dust regions, candidate dust regions were selected for image recovery as illustrated in FIGS. 1A-1I. Comparison between the results of texture synthesis and ground truth indicate that texture synthesis generates leaf structures and texture details that are different from the ground truth. Also, some leaf details appear slightly blurred due to texture irregularity and patch blending. In contrast, the present examples yield results that recover most of the original leaf appearance, as exhibited in FIGS. 1F and 1G. With the present examples, there is less susceptibility to blurring at least because of the use of structural constraints provided by the dust region and artifact formation modeling.

FIGS. 7A-7G illustrate another example of dust removal and candidate detection for a single image. FIG. 7A illustrates 17 actual dust regions among the top 18 candidates. Certain actual dust regions may be missing from the candidate list and other regions may include non-dust regions that are included among the candidates. The candidate list may aid a user in dust detection. FIG. 7B illustrates the recovered image, FIG. 7C illustrates the ground truth, FIG. 7D illustrates the original patch, FIG. 7E illustrates the resulting image, FIG. 7F illustrates texture synthesis of the image, and FIG. 7G illustrates the ground truth. The ground truth image in FIG. 7C is obtained with a camera that is free of sensor dust. For clearer examination of recovery quality, one dust region is enlarged for examination of recovery quality in comparison to texture synthesis and the ground truth.

As FIGS. 7A-7G illustrate, in the evaluation of dust candidates (r determined to be 4), 17 of the 20 actual dust regions in the image appear among the top 18 candidates in the ordered list. The actual dust regions are determined manually from a photo of a uniform scene. The three overlooked dust regions are also indicated and one incorrect candidate of the 18 is also identified. Thus, the user is provided with a tool for dust detection.

Multiple-Image Input

Multiple input images may be examined. Also, any of the different images may be obtained at different camera settings. Having multiple input images, even with different camera settings, detection and removal of dust artifacts may be improved as described. The dust transparency function $\beta$ may be considered fixed among images captured within a single session, for example, and this additional constraint may enable estimation of $\beta$ as well as a more reliable determination of d.

In one example, consider a set of images (e.g., $I_i$, i=1, 2, ..., m) and their corresponding F-numbers, $\rho_1, \rho_2, \ldots, \rho_m$. Similar to the formulation of color consistency in dust, $\alpha$ functions in these images may closely correspond to a common $\beta$ as follows:

$$\beta = \underset{\beta}{\mathrm{argmin}} \sum_i \|\beta * M_{\tau_i} - \alpha_i\|^2 \qquad \text{eqn. (8)}$$

where $M_{\tau_i} = \Pi_{\tau_i}$ and $\tau_i = d/\rho_i$. Thus, an energy term may be defined that represents consistency of $\beta$ among multiple images as follows:

$$E_5 = E(\alpha_1, \alpha_2, \ldots, \alpha_m, d) = \tfrac{1}{2} \Sigma_i \|\beta * M_{\tau_i} - \alpha_i\|^2 \qquad \text{eqn. (9)}$$

in which $M_{\tau_i} = \Pi_{\tau_i}$ and which has a derivative:

$$\partial E_5/\partial \alpha_i = \beta * M_{\tau_i} - \alpha_i$$

Thus, the overall energy function for multiple-image input may be represented as follows:

$$E^{multi} = \sum_{i=1}^m E_d^i + \lambda_5 \cdot E_5 \qquad \text{eqn. (10)}$$

where $E_d^i$ denotes a single-image energy for each $I_i$.

Estimation of d and $\beta$

Values of d and $\beta$ may be estimated. For example, d may be estimated with a larger number of input images. In this example, among m images, a set of $\alpha$ functions (e.g., $\alpha_1, \ldots, \alpha_m$) may be compared for each dust region. If the $\alpha$ functions arise from the same dust, they should satisfy m equations $\alpha_i = \beta * M_{d/\rho_i}$, i=1, ..., m, where $M_{d/\rho_i} = \Pi_{d/\rho_i}$, the correct value of d in this example providing the same $\beta$ when deconvolving the functions $\alpha_i$ by $\Pi_{d/\rho_i}$; otherwise, the inconsistency in $\beta$ may lead to a high energy (see, e.g., equation 9).

Returning to FIGS. 5A-5C, greater reliability in estimating d may be demonstrated. For sampled values of d, the optimization energy may be denoted as $E_d$, and may be plotted with respect to d. In this example, $\lambda_5$ may be set to 0.6. With two images as input, a minimum in $E_d$ is noticeable. With four images the minimum becomes clearer. Simultaneously, an estimate of β may be computed from eqn. (8). Given $\alpha_1$, $\alpha_2, \ldots, \alpha_n$, the function β can be solved by setting the partial derivative of $\Sigma_i \|\beta^* M_{\tau_i} - \alpha_i\|^2$, $M_{\tau_i} = \sqcap_{\tau_i}$, with respect to β to zero. Thus, recovered β functions may be expressed as:

$$\beta = \text{deconv}(\Sigma(\alpha_i * \overline{M}_{\tau_i}), \Sigma(M_{\tau_i} * \overline{M}_{\tau_i}))$$

where C=deconv(A,B) is the deconvolution operation to seek a C that satisfies A=B*C.

Figure 6B:
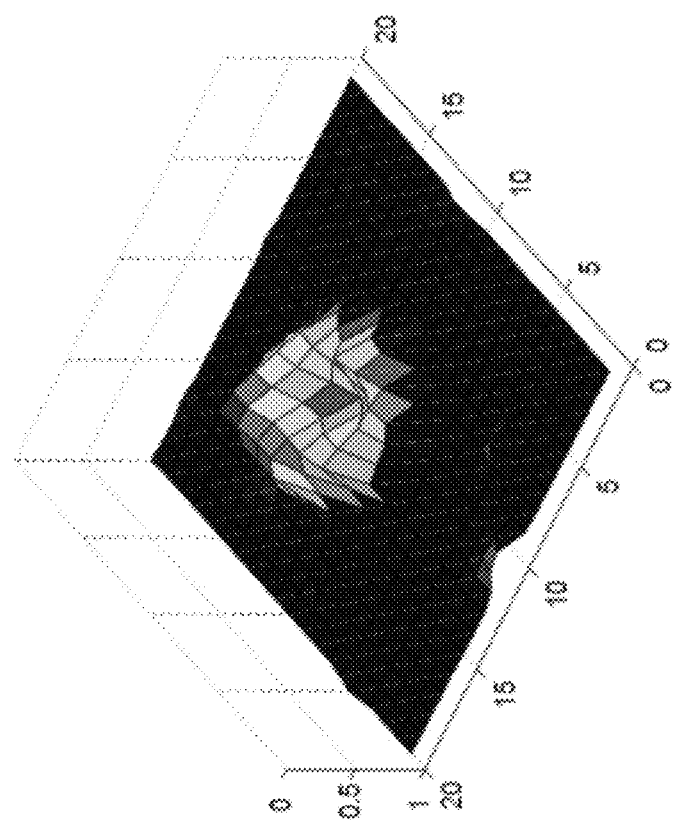
FIGS. 6A and 6B illustrate recovered functions for dust regions.
Figure 6A:
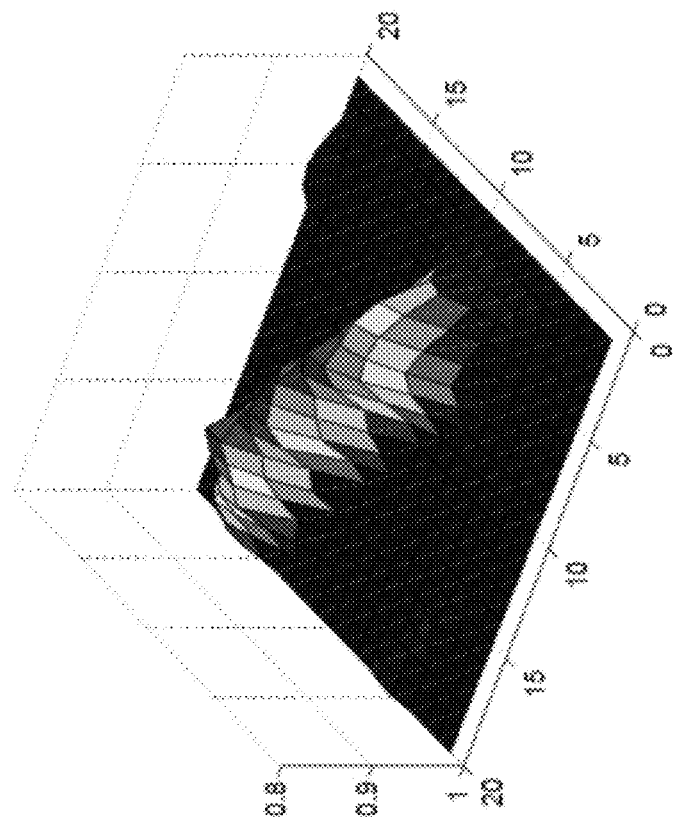

Recovered β functions for two of the dust regions are further illustrated in FIGS. 6A and 6B. In FIGS. 6A and 6B, two β functions are derived from multiple-image input. In this example, with multiple input images, candidate dust regions may be more reliably detected. For example, a powerful constraint is that the multiple input images must have similar β functions in solving for β.

In another example, a low-pass filter in a camera blurs a photograph by one or two pixels in order to prevent aliasing and Moiré effects. Since sensor dust lies on this filter, the blurring it induces may also influence the formation of a dust artifact. For a low-pass filter that blurs an image by one pixel in one dimension ("1D") in this example, an image may be obtained as follows:

$$I = (U \cdot \alpha) * \sqcap_1$$

where U is the dust-free image prior to filtering. If the dust were not present, then the low-pass filtered image may instead be $I' = U * \sqcap_1$. The original artifact function α without low-pass filtering may thus be transformed to a'=I/I' by the low-pass filter. In the discrete case, $(f * \sqcap_1)(x) = [f(x) + f(x+1)]/2$, such that the artifact function may be expressed as follows:

$$\alpha'(x) = \alpha(x) + \frac{U(x+1)}{U(x) + U(x+1)} \cdot [\alpha(x+1) - \alpha(x)]$$

The transformed artifact α'(x) may be bounded by α(x) and α(x+1). In another example, because of image noise and a smoothness of $\alpha = \beta^* \sqcap_\tau$, α' and α may be approximated to ignore the effect of the low-pass filter on dust artifacts.

FIGS. 8A-8K illustrate another example of results for complex input images. In this example, images were obtained by an imaging device (e.g., camera). In FIGS. 8A-8C, pictures were obtained at F/16, F/14, and F/11 respectively. FIG. 8A illustrates candidate detection results using only one image. There exists only two actual dust regions on the sensor. Using the photos (FIGS. 8A, 8B, and 8C) yields two actual dust regions as the top two candidates. In FIGS. 8D and 8E, close-ups of the dust regions in the images of FIGS. 8A-8C are presented. In FIGS. 8F and 8G, texture synthesis results are presented containing a synthesis region. FIGS. 8H and 8I illustrate results of single-image dust removal and FIGS. 8J and 8K illustrate the result of dust removal using all three images (FIGS. 8A-8C) together.

Two dust regions were examined although the photographs also contain additional small dark regions. Detection of candidate dust regions is performed in which each image may be processed independently. Alternatively or additionally, a single-image method may be performed. For example, applying the single-image method on the image of FIG. 8A, two true dust regions appear among the top 11 candidates. Similar results may be obtained when processing the other images (e.g., FIGS. 8B and 8C) individually. When using all three images as input, the two dust regions become the top two candidates. In the close up images, the recovery results (FIGS. 8H-8K) are improved when compared to that of texture synthesis (FIGS. 8F-8G).

Thus, a system and method is described in which an approach to sensor dust removal is applied that may utilize image information inside a damaged region, or region occluded by an artifact. To effectively utilize this data in one example, an artifact formation model for sensor dust is provided in which the dust region information, together with the artifact model, jointly provides a constraint on the possible dust removal solutions. Image context and color consistency of dust are additionally utilized to recover an image that closely matches the actual scene. When multiple images are available, the method and system can offer a more reliable list of candidate dust regions from which to choose.

In another example, the system and method may be applied to other applications. For example, similar artifacts may appear in scanned images due to fingerprints or smudges on the apparatus (e.g., scanner glass). The use of contextual information in the dust removal technique may be applied to such images as well. Accordingly, the term "dust" as used herein typically refers to dust, particles, fingerprints, smudges, and/or any other object(s), substance(s), or the like that may occlude the original scene or ground truth in an image. The term "artifact" as used herein typically refers to the occlusive effect of such dust on an image. The term "recovering a dust-free image" or "recovering an artifact-free image" or the like typically refers to processing an image as described herein resulting in an image wherein the effects of such artifacts are minimized or removed from the image such that the image very closely reflects the ground truth. Such a recovered image (or region) may be described as "undusted" or "dust-free". Note that the ground truth may be an actual scene, such as a landscape, and/or another image, as in the case of scanning and the like.

Figure 10:
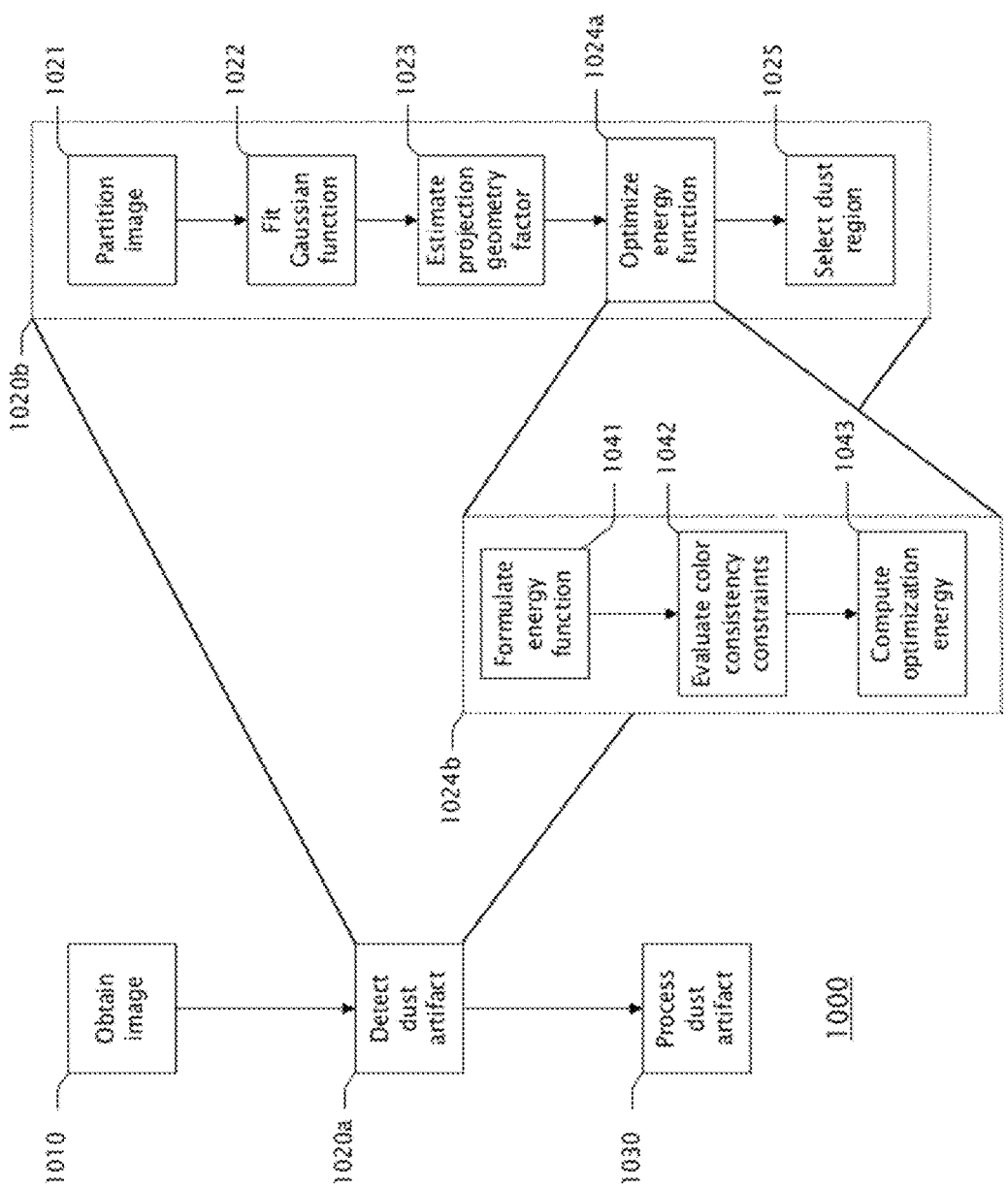
FIG. 10 is a block diagram showing an example method for recovering a dust-free image.

FIG. 10 is a block diagram showing an example method 1000 for recovering a dust-free image. Method 1000 may be performed in a computing environment such as that described in connection with FIG. 11. Such a computing environment may exist within a digital camera, such as a digital camera producing an original image, or may alternatively be a computing device such as a personal computer or the like.

Block 1010 typically indicates obtaining a digital image that may include dust artifacts. Such artifacts may be the result of dust or the like located on the sensor array of the digital camera producing the image or on a low-pass filter or the like, or on any other surface, positioned in front of the sensor. The digital image may be an original image, such as one just produced by a digital camera by a user taking a picture, or it may be any digital image that may or may not have undergone previous processing for any purpose, including a copied image, a scanned image, a video frame, or the like. Once an image has been obtained, then method 1000 typically continues at block 1020*a*.

Block 1020*a* typically indicates detecting a dust artifact in the image. In general, this is done as described herein above by partitioning the image into small overlapping regions, fitting a Gaussian function to each region and determining if the Gaussian function indicates a dust artifact. In one example, the partitions may be 15 by 15 pixels in size. In other examples, the size of the regions may vary one from another and/or the regions may be rectangular rather than square. An example method 1020*b* for detecting a dust artifact in an image is described in more detail in connection with block 1020*b*. Once a dust artifact has been detected, then method 1000 typically continues at block 1030.

Block 1030 typically indicates processing a dust artifact to recover a dust-free region. In one example, this processing may include formulating an energy function, evaluating color consistency constraints, and optimizing the energy function. In another example, these steps may have already been performed during the detecting step as described in connection with block 1020a. The final aspect of processing typically includes recovering a dust-free region according to the minimized values of the corresponding selected region's energy function as described herein above. Once all dust artifacts in an image have been detected and the dust-free region recovered, method 1000 is typically complete.

Block 1020b provides an example method 1020b for detecting a dust artifact in a region of the digital image. In general, an image is partitioned into small overlapping regions and each region is analyzed for evidence of a dust artifact or the like. Each region, or candidate region, including such an artifact may be processed if selected (see block 1025) to recover a dust-free region.

Block 1021 typically indicates partitioning the image into small overlapping regions. In one example, a region may be 15 by 15 pixels in size. The exact size of a region may be selected to best detect dust artifacts on an expected size. The exact overlap of a region may be selected to avoid missing artifacts located on region boundaries. Once an image has been partitioned onto small overlapping regions, then method 1020b typically continues for each such region at block 1022.

Block 1022 typically indicates fitting a Gaussian function to a region. In one example, the fitting of a Gaussian function to a region is done in a conventional manner. Once fitted to a region, the Gaussian function is evaluated for indication of a dust artifact in the region. In one example, such may be indicated by a concave brightness structure suggesting attenuation caused by a possible dust particle or the like. Regions with dust artifacts are considered candidate regions; iterative optimization as described herein above and in connection with blocks 1024b and 1024b is then used to select regions considered to include artifacts. Once the fitting and evaluation have been completed, then method 1020b typically continues at block 1023.

Block 1023 typically indicates computing a projection geometry factor τ. In general, additionally considering FIG. 2, the actual projection geometry factor τ* may not be known when the distance d between low-pass filter 205 and sensor array 204 is not known. Thus the projection geometry factor r is estimated as described herein above and then method 1020b typically continues at block 1024.

Block 1024a typically indicates iteratively optimizing an energy function of a region including formulating the energy function. Optimizing the energy function typically includes evaluating constraints based on artifact formation, context, dust characteristics, and color consistency constraints as described herein above. An example method 1024b for optimizing an energy function is described in more detail in connection with block 1024b. Once optimized, then method 1020b typically continues at block 1025.

Block 1025 typically indicates selecting a dust region based on energy value. In one example, this is done by showing a user the candidate regions with the lowest energy values and allowing the user to decide which regions contain dust or the like. In another example, selection may be made by method 1020b based on the optimization energy value of a candidate region being below a certain value (such as a value established by a user or the like). Once a candidate region is selected as including a dust artifact, the selected region is processed to recover a dust-free region as per block 1030.

Block 1024b provides an example method 1024b for iteratively optimizing an energy function used in recovering a dust-free region. Once all regions including artifacts have been recovered, then the image is considered recovered and dust-free.

Block 1041 typically indicates formulating an energy function to be used in recovering a dust-free region. In one example, an energy function for recovery is formulated as described herein above. Such an energy function may utilize an artifact formation model, contextual constraints from the image surrounding the region, and constraints from the function space of a. Once the energy function is formulated, then method 1024b typically continues at block 1042.

Block 1042 typically indicates evaluating color consistency constraints. In one example, color constraints may be evaluated as described herein above. In another example, color consistency constraints may not be evaluated. In yet another example, the evaluating may be performed as part of the optimizing. Once color consistency constraints have been evaluated, then method 1024b typically continues at block 1043.

Block 1043 typically indicates computing the optimization energy of a region using the formulated energy function. In one example, the energy function is optimized as described herein above. Once the energy function is optimized, then method 1024b is typically complete.

Once method 1024b is completed for all selected regions then the image is considered recovered and dust-free.

Figure 11:
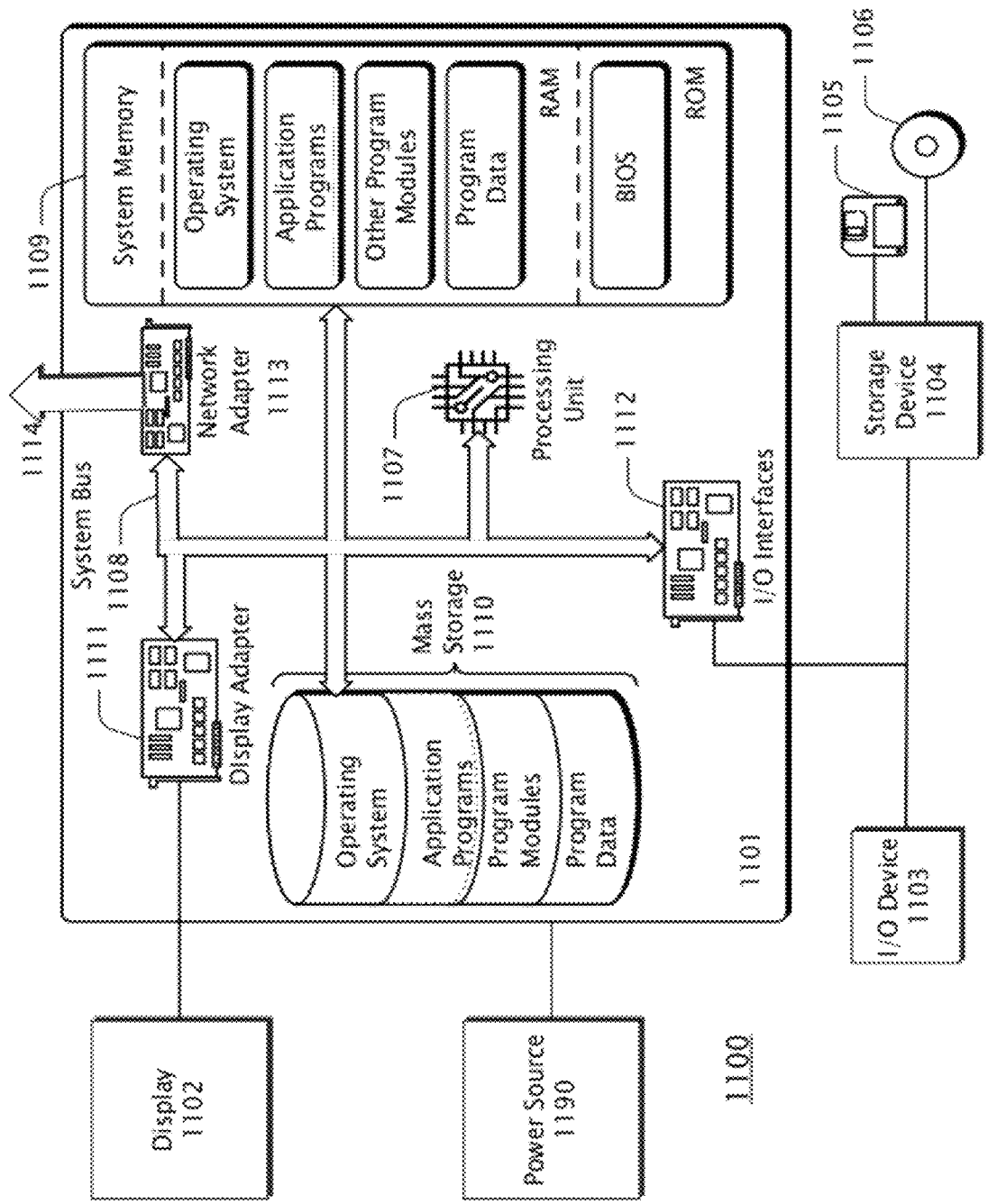
FIG. 11 is a block diagram showing an example computing environment in which the technologies described herein may be implemented.

FIG. 11 is a block diagram showing an example computing environment 1100 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 1100 typically includes a general-purpose computing system in the form of a computing device 1101 coupled to various components, such as peripheral devices 1102, 1103, 1104 and the like. System 1100 may couple to various other components, such as input devices 1103, including voice recognition, touch pads, buttons, keyboards and/or pointing devices, such as a mouse or trackball, via one or more input/output ("I/O") interfaces 1112. The components of computing device 1101 may include one or more processors (including central processing units ("CPU"), graphics processing units ("GPU"), microprocessors ("µP"), and the like) 1107, system memory 1109, and a system bus 1108 that typically couples the various components. Processor 1107 typically processes or executes various computer-executable instructions to control the operation of computing device 1101 and to communicate with other electronic and/or computing devices, systems or environment (not shown) via various communications connections such as a network connection 1114 or the like. System bus 1108 represents any number of several types of bus structures, including a memory bus or memory controller, a peripheral bus, a serial bus, an accelerated graphics port, a processor or local bus using any of a variety of bus architectures, and the like.

System memory 1109 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 1109 typically stores data, computer-executable instructions and/or program modules comprising computer-executable instructions that are immediately accessible to and/or presently operated on by one or more of the processors 1107.

Mass storage devices 1104 and 1110 may be coupled to computing device 1101 or incorporated into computing device 1101 via coupling to the system bus. Such mass storage devices 1104 and 1110 may include non-volatile RAM, a magnetic disk drive which reads from and/or writes to a removable, non-volatile magnetic disk (e.g., a "floppy disk") 1105, and/or an optical disk drive that reads from and/or writes to a non-volatile optical disk such as a CD ROM, DVD ROM 1106. Alternatively, a mass storage device, such as hard disk 1110, may include non-removable storage medium. Other mass storage devices may include memory cards, memory sticks, tape storage devices, and the like.

Any number of computer programs, files, data structures, and the like may be stored in mass storage 1110, other storage devices 1104, 1105, 1106 and system memory 1109 (typically limited by available space) including, by way of example and not limitation, operating systems, application programs, data files, directory structures, computer-executable instructions, and the like.

Output components or devices, such as display device 1102, may be coupled to computing device 1101, typically via an interface such as a display adapter 1111. Output device 1102 may be a liquid crystal display ("LCD"). Other example output devices may include printers, audio outputs, voice outputs, cathode ray tube ("CRT") displays, tactile devices or other sensory output mechanisms, or the like. Output devices may enable computing device 1101 to interact with human operators or other machines, systems, computing environments, or the like. A user may interface with computing environment 1100 via any number of different I/O devices 1103 such as a touch pad, buttons, keyboard, mouse, joystick, game pad, data port, and the like. These and other I/O devices may be coupled to processor 1107 via I/O interfaces 1112 which may be coupled to system bus 1108, and/or may be coupled by other interfaces and bus structures, such as a parallel port, game port, universal serial bus ("USB"), fire wire, infrared ("IR") port, and the like.

Computing device 1101 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 1101 may be coupled to a network via network adapter 1113 or the like, or, alternatively, via a modem, digital subscriber line ("DSL") link, integrated services digital network ("ISDN") link, Internet link, wireless link, or the like.

Communications connection 1114, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 1190, such as a battery or a power supply, typically provides power for portions or all of computing environment 1100. In the case of the computing environment 1100 being a mobile device or portable device or the like, power source 1190 may be a battery. Alternatively, in the case computing environment 1100 is a desktop computer or server or the like, power source 1190 may be a power supply designed to connect to an alternating current ("AC") source, such as via a wall outlet.

Some mobile devices may not include many of the components described in connection with FIG. 11. For example, an electronic badge may be comprised of a coil of wire along with a simple processing unit 1107 or the like, the coil configured to act as power source 1190 when in proximity to a card reader device or the like. Such a coil may also be configure to act as an antenna coupled to the processing unit 1107 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 1102, I/O device 1103, or many of the other components described in connection with FIG. 11. Other mobile devices that may not include many of the components described in connection with FIG. 11, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

It is understood that aspects of the present invention can take many forms and embodiments. The embodiments shown herein are intended to illustrate rather than to limit the invention, it being appreciated that variations may be made. Although illustrative embodiments have been shown and described, a wide range of modification, change and substitution is intended in the foregoing disclosure and in some instances some features may be employed without a corresponding use of the other features. Accordingly, it is appropriate that the appended embodiments be construed broadly and in a manner consistent with the scope of the description.

The invention claimed is:

1. A system comprising a computing device and at least one program module that are together configured for performing actions comprising:
   identifying an artifact in an image, where the artifact results from an impurity, and where the identifying comprises:
      determining, with respect to an estimated projection geometry, a function space of possible impurity artifacts,
      identifying a minimum distance between an estimated artifact formation model and one of the possible impurity artifacts of the determined function space, and
      constructing, based on the determined function space and on the identified minimum distance, a dust removal solution; and
   removing, based on the constructed dust removal solution, the identified artifact from the image.

2. The system of claim 1 where the estimated projection geometry is based on a displacement of a filter from a sensor.

3. The system of claim 1 where the removing comprises performing an iterative optimization that solves for a proportion of scene radiance that passes through the impurity and reaches a sensor, and for an impurity-free appearance of a portion of the image.

4. The system of claim 1 where the removing is in response to distinguishing the artifact from an image feature based on a color consistency.

5. The system of claim 4 where the distinguishing comprises assuming that the impurity is composed of a material that is monochromatic or of uniform color.

6. The system of claim 4 where the distinguishing comprises detecting candidate impurity regions.

7. A method performed on a computing device, the method comprising:
   identifying an artifact in an image, where the artifact results from an impurity, and where the identifying comprises:
      determining, with respect to an estimated projection geometry, a function space of possible impurity artifacts,
      identifying a minimum distance between an estimated artifact formation model and one of the possible impurity artifacts of the determined function space, and
      constructing, based on the determined function space and on the identified minimum distance, a dust removal solution; and
   removing, based on the constructed dust removal solution, the identified artifact from the image.

8. The method of claim 7 where the estimated projection geometry is based on a displacement of a filter from a sensor.

9. The method of claim 7 where the removing comprises performing an iterative optimization that solves for a proportion of scene radiance that passes through the impurity and reaches a sensor, and for an impurity-free appearance of a portion of the image.

10. The method of claim 7 where the removing is in response to distinguishing the artifact from an image feature based on a color consistency.

11. The method of claim 10 where the distinguishing comprises assuming that the impurity is composed of a material that is monochromatic or of uniform color.

12. The method of claim 10 where the distinguishing comprises detecting candidate impurity regions.

13. At least one computer-readable storage device storing computer-executable instructions that, when executed by a computing device, cause the computing device to perform a method comprising:
   identifying an artifact in an image, where the artifact results from an impurity, and where the identifying comprises:
      determining, with respect to an estimated projection geometry, a function space of possible impurity artifacts,
      identifying a minimum distance between an estimated artifact formation model and one of the possible impurity artifacts of the determined function space, and
      constructing, based on the determined function space and on the identified minimum distance, a dust removal solution; and
   removing, based on the constructed dust removal solution, the identified artifact from the image.

14. The at least one computer-readable storage device of claim 13 where the estimated projection geometry is based on a displacement of a filter from a sensor.

15. The at least one computer-readable storage device of claim 13 where the removing comprises performing an iterative optimization that solves for a proportion of scene radiance that passes through the impurity and reaches a sensor, and for an impurity-free appearance of a portion of the image.

16. The at least one computer-readable storage device of claim 13 where the removing is in response to distinguishing the artifact from an image feature based on a color consistency.

17. The at least one computer-readable storage device of claim 16 where the distinguishing comprises assuming that the impurity is composed of a material that is monochromatic or of uniform color.

18. The at least one computer-readable storage device of claim 16 where the distinguishing comprises detecting candidate impurity regions.

* * * * *